United States Patent
Hua-Nan et al.

(10) Patent No.: US 6,989,873 B2
(45) Date of Patent: Jan. 24, 2006

(54) BACKLIGHT MODULE AND LIQUID CRYSTAL DISPLAY FORMED THEREFROM

(75) Inventors: Huang Hua-Nan, Miaoli (TW); Mai Che-Kuei, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 29 days.

(21) Appl. No.: 10/804,490

(22) Filed: Mar. 18, 2004

(65) Prior Publication Data

US 2004/0183962 A1  Sep. 23, 2004

(30) Foreign Application Priority Data

Mar. 19, 2003 (TW) .............................. 92204304 U (51) Int. Cl.
*G02F 1/1335* (2006.01)

(52) U.S. Cl. .................... 349/64; 349/61; 345/87; 362/615

(58) Field of Classification Search .............. 349/61, 349/64; 362/560, 561, 615, 518; 385/146; 345/87

See application file for complete search history.

(56) References Cited

U.S. PATENT DOCUMENTS

| | | | |
|---|---|---|---|
| 4,642,736 A | 2/1987 | Masuzawa et al. ........... 362/31 |
| 4,738,042 A | 4/1988 | Corden et al. ................ 40/472 |
| 4,860,171 A | 8/1989 | Kojima ......................... 362/31 |
| 4,998,804 A * | 3/1991 | Horiuchi ....................... 349/64 |
| 5,730,484 A | 3/1998 | Robinson .................... 296/976 |
| 5,961,197 A | 10/1999 | Watai et al. ................... 362/31 |
| 6,527,426 B2 | 3/2003 | Oyama et al. .............. 362/517 |
| 6,913,378 B2 * | 7/2005 | Ho ............................... 362/560 |
| 2003/0086265 A1 | 5/2003 | Iisaka et al. ................. 362/268 |
| 2004/0130912 A1 * | 7/2004 | Miyashita .................... 362/561 |

* cited by examiner

*Primary Examiner*—Huyen Ngo
(74) *Attorney, Agent, or Firm*—Haverstock & Owens LLP (57) ABSTRACT

A backlight module for providing a light with more uniform light distribution and greater brightness is provided. The backlight module includes at least a luminary for providing a light, a light guide assembly disposed adjacent to the luminary for guiding a first portion of the light, a translucent membrane with a plurality of openings thereon, and a reflector disposed below the light guide assembly. In which, a second portion of the light passes upwardly through the openings and a third portion of the light is directed upwardly by the light guide assembly after being reflected by the translucent membrane and the reflector. Further, the light guide assembly includes a plurality of light guide plates, in which the bottom of at least one light guide plate can be a triangular concave or an arc concave, and the light guide plates can have some doping particles therein.

8 Claims, 8 Drawing Sheets

Fig. 8

BACKLIGHT MODULE AND LIQUID CRYSTAL DISPLAY FORMED THEREFROM

FIELD OF THE INVENTION

This invention mainly relates to a backlight module, and more particularly to a backlight module applied in a liquid crystal display device.

BACKGROUND OF THE INVENTION

A backlight module is one of the key components for the liquid crystal display (LCD). Since the liquid crystal cannot luminesce itself, the function of the backlight module is to provide the light source, which can provide sufficient brightness and uniform light distribution for image display on the LCD panel. In recent years, since the LCD has been widely applied to an increasing number of electrical products, such as monitors, notebook computers, cameras, personal digital assistants (PDA), mobile phones and projectors, etc., the accompanied demands for backlight modules and other related components are continuously growing.

Figure 1:
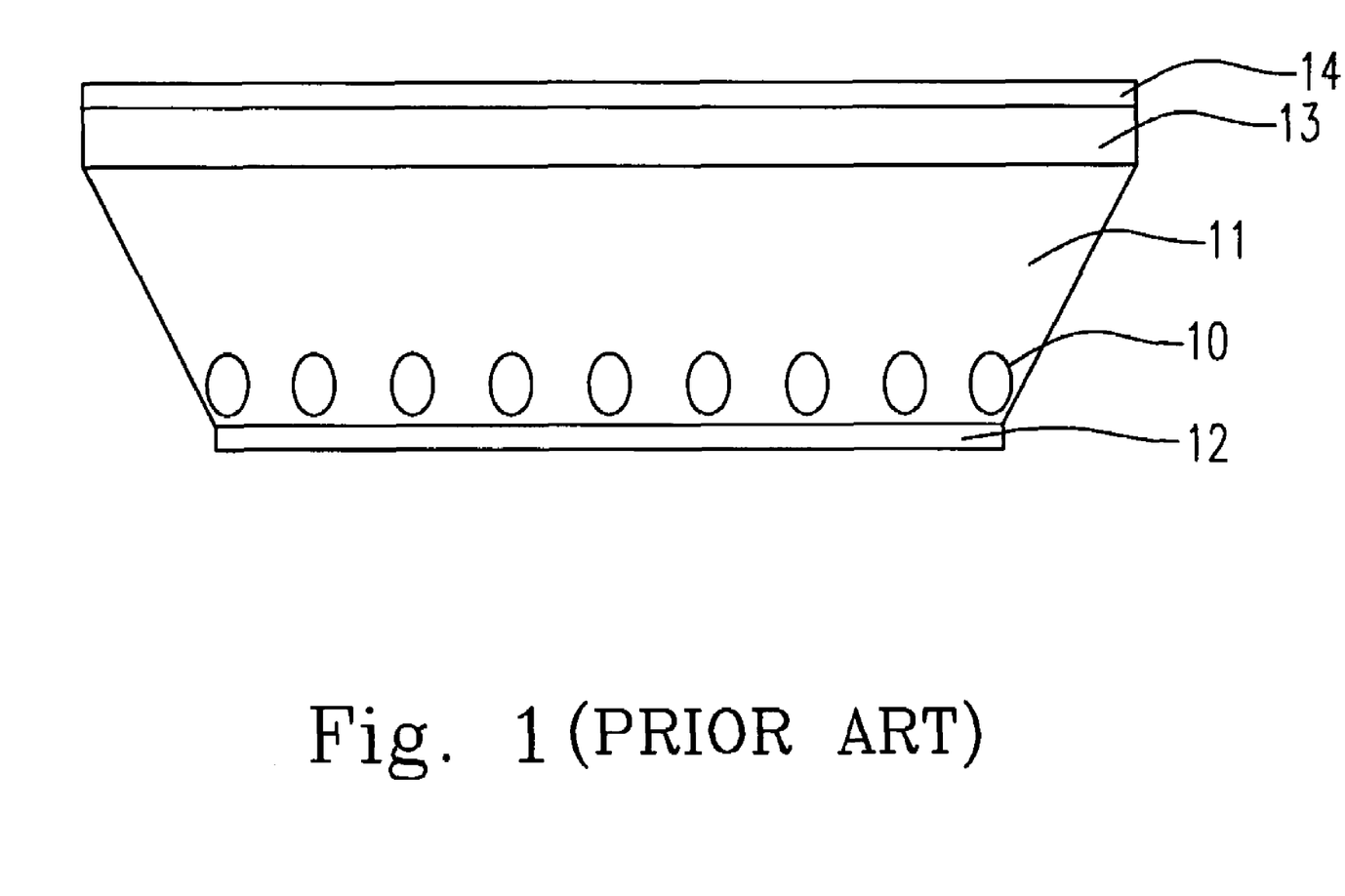
FIG. 1 shows a structural diagram of a prior backlight module.

Please refer to FIG. 1, which is a structural diagram of a backlight module according to the prior art. The backlight module mainly includes the light source 10, the light guide plate 11, the reflector 12, the diffuser 13, the lens sheet 14 and the frame, etc. It is necessary that the light source 10 has the properties of high brightness and long usage duration. Nowadays, the common light sources include the cold cathode fluorescent lamp (CCFL), the hot cathode fluorescent lamp (HCFL), the light-emitting diode (LED), and the electro luminescent (EL) sheet, etc. Among the above, the CCFL is the mainstream in the market these days. The light guide plate 11 is used for directing the scattering direction of the light so that the panel luminance would be increased and the uniformity of the panel luminance would be ensured. The light guide plate 11 is formed through pressing the propylene material into a plate with smooth surface by the injection molding method. Afterward, the particular materials having the properties of high light reflectivity and extremely low light absorption are coated at the bottom surface of the light guide plate 11 for forming numerous diffusion points. Since the diffusion points reflect the light along various angles and directions, the whole light reflectivity of the plate may be influenced. In other words, it is possible that the luminance of the light guide plate 11 can be uniform across the panel by controlling the sizes and densities of the diffusion points. The reflector 12 is used to reflect the leaked light back to the light guide plate 11 so as to improve the utility efficiency of the light. In addition, the function of the diffuser 13 is to distribute the light across the panel more uniformly, and thereby preventing shadows of the diffusion points from being formed on the front side. However, because the directions of the light reflected from the diffuser 13 are too irregular, it is necessary to condense the lights by the lens sheet 14 for achieving a greater brightness at the front side.

In general, the backlight modules can be divided into two groups, the bottom-lighting type and the edge-lighting type, categorized by the positions of the light sources. Nowadays, the light sources for big-size panels are always designed as the bottom-light type. The bottom-lighting backlight module is designed to dispose the lamp tubes just below the module. Since the luminance of the lamp tube is bright and different from that of other parts of the module, it is easy to see the obvious lamp tube from the panel. Further, the obstacles for the pixel design are increased. For avoiding the described flaws, such as the discordant brightness, it is usual to increase the thickness of the light guide plate to a certain thickness. Also, the panel pixels near the lamp tubes are further designed to smaller pixels and have lower pixel-distribution densities. However, in such a way, the thickness and the weight of the backlight modules are always unavoidably increased.

SUMMARY OF THE INVENTION

A backlight module including at least a luminary, a light guide assembly, and a translucent membrane is provided in the present invention. The luminary is used to provide the light, the light guide assembly disposed at two sides of the luminary is used to guide a first portion of the light towards upwardly, and the translucent membrane is disposed above the luminary and has a plurality of openings thereon. In which, a second portion of the light passes upwardly through the openings and a third portion of the light is directed upwardly by the light guide assembly after being reflected by the translucent membrane.

Preferably, the light guide assembly includes a plurality of light guide plates, which are made of either polymethylmethacrylate (PMMA) or polycarbonate (PC), and a doping particle is included in at least one of the plurality of light guide plates.

Preferably, at least one of the plurality of light guide plates has a triangular concave or an arc concave at a bottom, and at least one of the light guide plates is a wedge-shaped plate having a thick end and a thin end. In which, the thick end of the wedge-shaped plate is positioned adjacent to the luminary.

Preferably, the backlight module further includes a reflector disposed below the light guide assembly for improving the utility efficiency of the light by reflecting the light back to the backlight module and a diffuser disposed above the light guide assembly and the translucent membrane for distributing the light more uniformly.

Preferably, the backlight module further includes a lens sheet disposed above the diffuser for modifying a direction of the light so as to achieve a focusing effect.

Preferably, the luminary is a cold cathode fluorescent lamp or a lamp tube.

Preferably, the translucent membrane is one of an arc and a planar membrane.

In accordance with another aspect of the present invention, a liquid crystal display is provided. The liquid crystal display includes at least a luminary, a light guide assembly disposed adjacent to the luminary, a translucent membrane, and a liquid crystal panel. In which, the luminary is used to provide a light, and the light guide assembly is used to direct a first portion of the light towards upwardly. In addition, the translucent membrane is disposed above the luminary and includes a plurality of openings thereon. Furthermore, the liquid crystal panel is disposed above the light guide assembly and the translucent membrane. Additionally, a second portion of the light passes upwardly through the openings and a third portion of the light is directed upwardly by the light guide assembly after being reflected by the translucent membrane.

Preferably, the light guide assembly includes plurality of light guide plates, which are made of either polymethylmethacrylate (PMMA) or polycarbonate (PC), and a doping particle is included in at least one of the plurality of light guide plates. In which, the liquid crystal display further includes a reflector disposed below the light guide assembly for improving the utility efficiency of the light by reflecting the light back to the backlight module and a diffuser disposed above the light guide assembly and the translucent membrane for distributing the light more uniformly. Preferably, the liquid crystal display further includes a lens sheet disposed above said diffuser for modifying a direction of said light so as to achieve a focusing effect.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. For overcoming the flaws of the appearance of the lamp tube within the front view of the backlight module, the present invention provides a backlight module with an additional translucent membrane.

Figure 2:
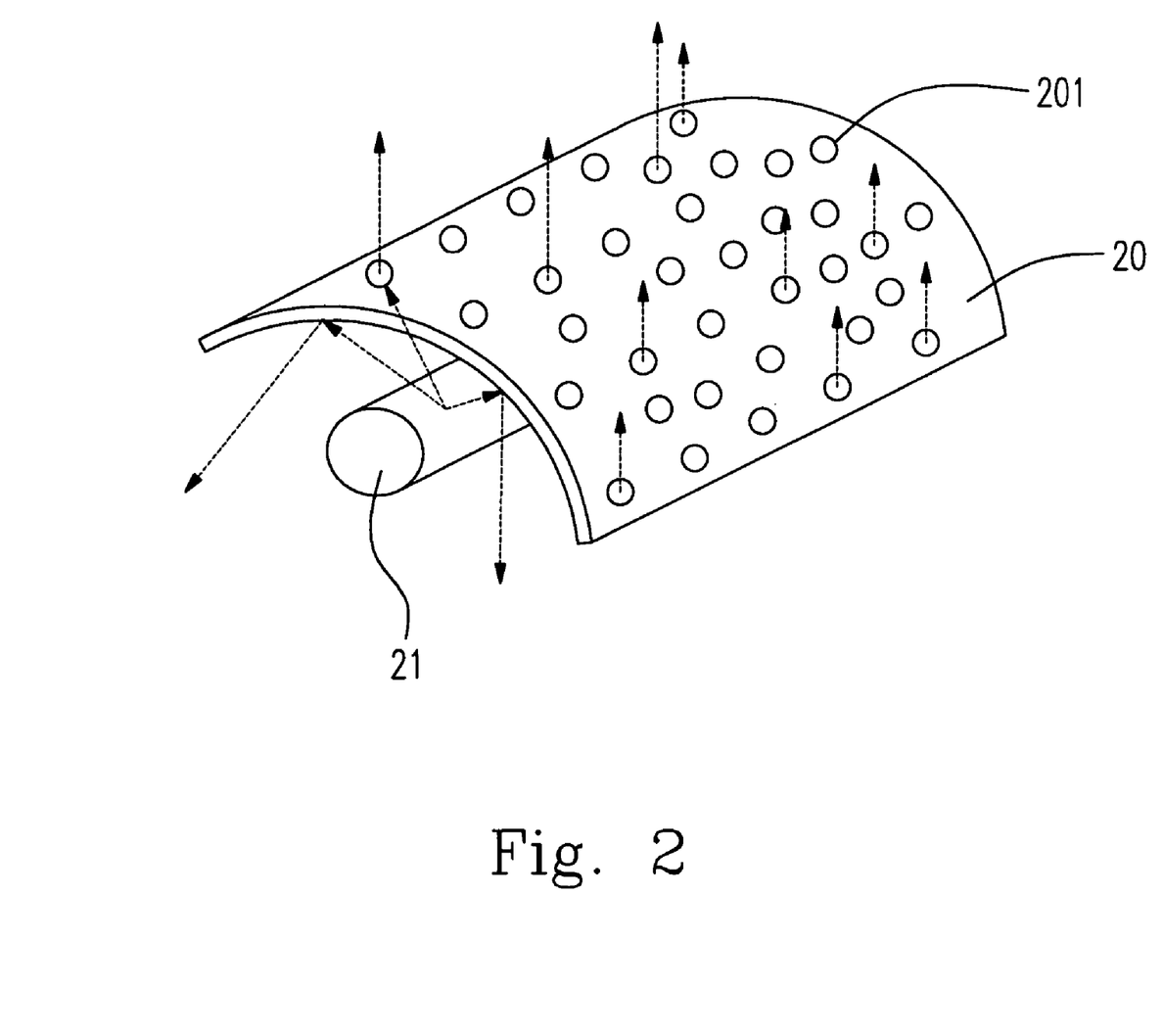
FIG. 2 shows a diagram of the translucent membrane according to a preferred embodiment of the present invention.

Please refer to FIG. 2, which is the diagram of the translucent membrane according to a preferred embodiment of the present invention. The translucent membrane 20 having a plurality of openings 201 mounted thereon is disposed above the lamp tube 21 for dispersing the light of the lamp tube 21 and avoiding the lamp tube 21 from appearing too obviously within the panel (not shown) of the backlight module. The translucent membrane 20 can be arc or planar. The translucent membrane 20 has an anti-dazzling function and is made of the materials such as polymide (PI) and poly carbonate (PC), etc. The light passes upwardly through the openings 201. On the other hand, if the light goes through the remaining portion of translucent membrane 20 (the portion except the openings 201), the light is reflected downward to a light guide plate (not shown), and then reflected upward by the light guide plate. The design for translucent membrane 20 can be optimized by properly controlling the size, the distribution and the density of the openings 201, and adjusting the slope and the pattern of the light guide plate. Further, the translucent membrane 201 can be disposed above the lamp tube 21 with a particular radian.

Figure 3:
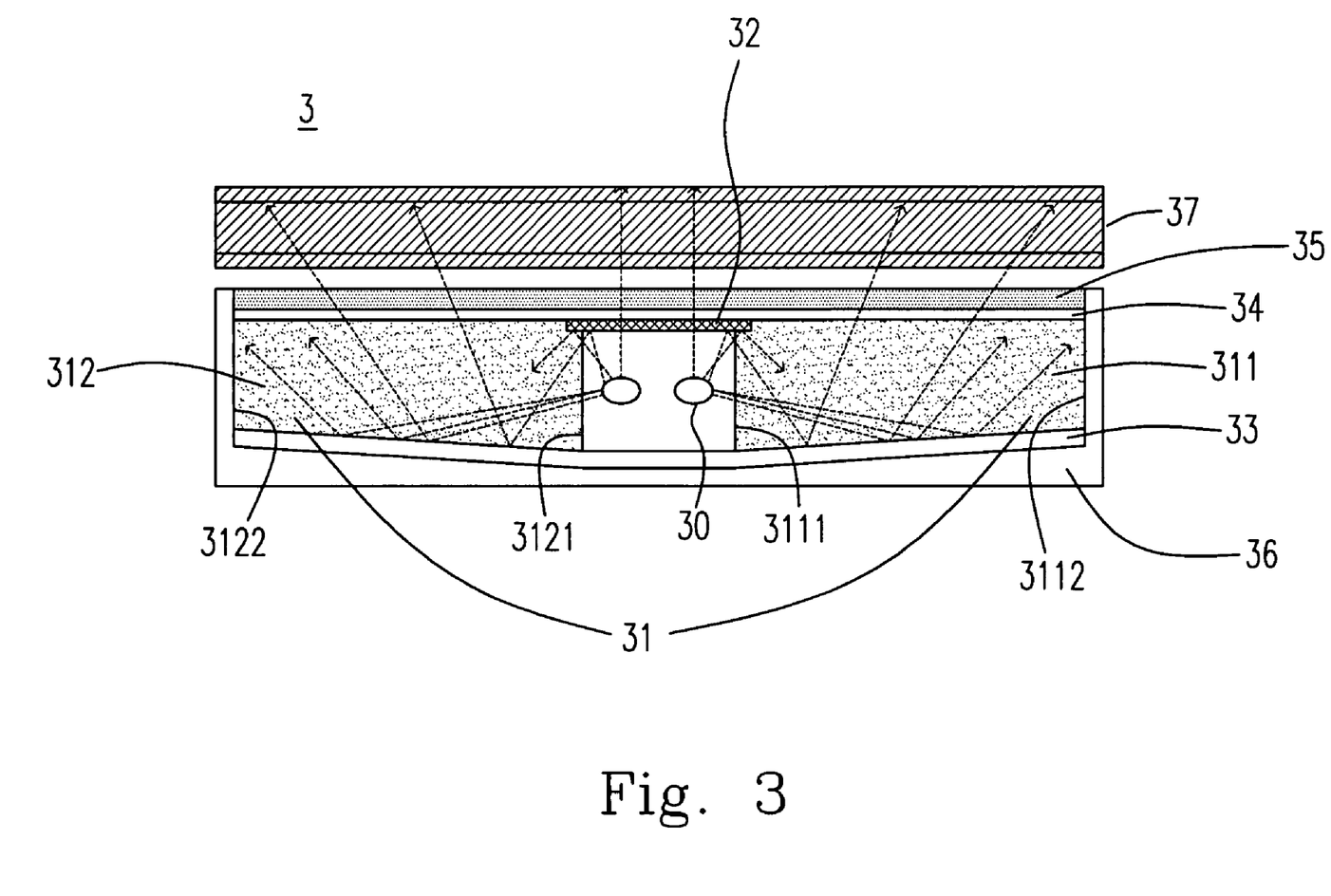
FIG. 3 shows a diagram of the backlight module according to a first preferred embodiment of the present invention.

Please refer to FIG. 3, which is a structural diagram of the backlight module according to the first preferred embodiment of the present invention. The backlight module 3 includes the luminary 30, the light guide assembly 31, the translucent membrane 32, the reflector 33, the diffuser 34, the lens sheet 35 and the frame 36. The luminary 30 includes at least a lamp tube and is used for providing the light. The light guide assembly 31 includes two wedge-shaped light guide plates 311, 312, which are respectively disposed at two sides of the luminary 30. Each of the wedge-shaped light guide plates 311, 312 has a thick end 3111, 3121 and a thin end 3112, 3122. The thick ends 3111, 3121 of the wedge-shaped light guide plates 311, 312 are respectively positioned near to the luminary 30, and the thin ends 3112, 3122 are used to modify the direction of the light from the luminary 30 and the light reflected from the thick ends 3111, 3121. A planar-shaped light guide plate can also be used to replace above mentioned wedge-shaped light guide plate. The translucent membrane 32 having a plurality of openings thereon is disposed above the luminary 30 for dispersing the light of the luminary 30 and avoiding the luminary 30 from appearing too obviously within the panel 37. The reflector 33 is disposed below the light guide assembly 31 for improving the efficiency of the light by reflecting the light back to light guide assembly 31. The diffuser 34 is disposed above the light guide assembly 31 and the translucent membrane 32 for distributing the light more uniformly. The lens sheet 35 is disposed above the diffuser 34 for modifying a direction of the light so as to achieve a light focusing effect.

According to the above embodiment, the light radiating from the lamp tube of the luminary 30 will emit along various directions first. When the light goes through the light guide assembly 31, the light can be directed upward to the LCD panel 37 by the diffusion points and the reflection points, which are both (not shown) on the light guide assembly 31. Or, the directed light from the light guide assembly 31 can be reflected to the reflector 33, and then the directed light can be reflected back to the light guide assembly 31 by the reflector 33. In other words, if the light from the luminary 30 is transmitted upward to the openings 201, the light will pass through the openings 201 directly. But, if the light is transmitted to the remaining portion of translucent membrane 32 (the portion except the openings), the light will be reflected downward, and then reflected upward and transmitted outward by the light guide assembly 31 and the reflector 33. As a result, with the design of using the translucent membrane having openings mounted thereon, it is able to distribute the light uniformly and at the same time, prevent the luminary from appearing too obviously within the panel.

Figure 4:
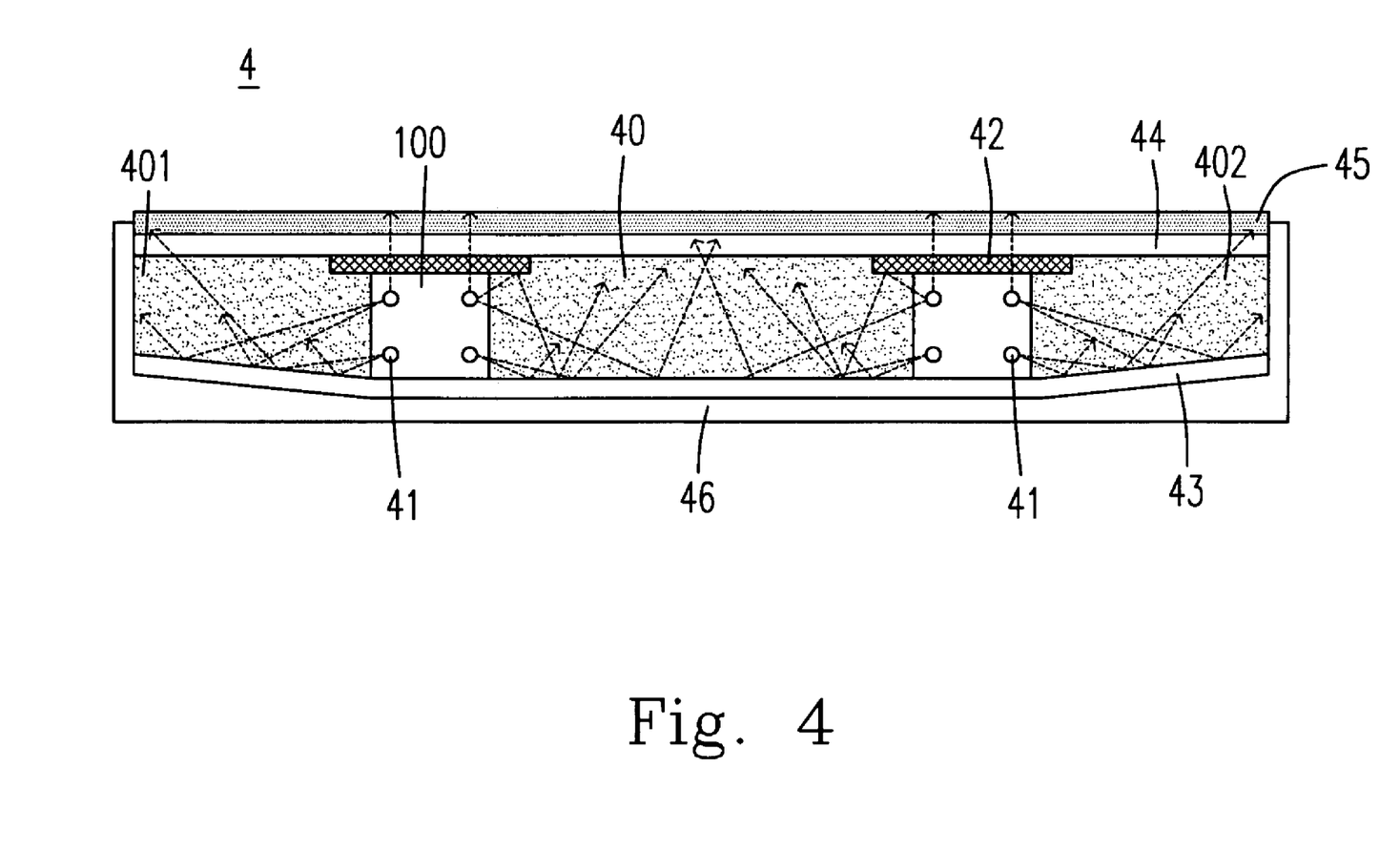
FIG. 4 shows a diagram of the backlight module according to a second preferred embodiment of the present invention.

Please refer to FIG. 4, which is a structural diagram of the backlight module according to the second preferred embodiment of the present invention. The backlight module 4 includes the cold cathode fluorescent lamps 41, a plurality of light guide plates 40, 401, 402, the translucent membranes 42, the reflectors 43, the diffusers 44, the lens sheet 45 and the frame 46.

In which, the light guide plates 40, 401, 402 are made of polymethylmethacrylate (PMMA) or polycarbonate (PC) and form a space 100 for positioning the cold cathode fluorescent lamps 41. In addition, the light guide plates 401 and 402 located at the outsides of the cold cathode fluorescent lamps 41 are wedge-shaped light guide plates. A planar-shaped light guide plate can also be used to replace above mentioned wedge-shaped light guide plate. The translucent membranes 42 having a plurality of openings thereon (as shown in FIG. 2) are disposed above the cold cathode fluorescent lamps 41 for dispersing the light of the cold cathode fluorescent lamps 41 and at the same time, preventing the cold cathode fluorescent lamps 41 from appearing too obviously. The reflectors 43 are disposed below the light guide plates 40, 401, 402 for improving the utility efficiency of the light by reflecting the light back to light guide plates 40, 401, 402. The diffusers 44 are disposed above the light guide plates 40, 401, 402 and the translucent membranes 42 for distributing the light more uniformly. In addition, the frame 46 is used to contain the cold cathode fluorescent lamps 41, the plurality of light guide plates 40, 401, 402, the translucent membranes 42, the reflectors 43, and the diffusers 44.

Thereby, the cold cathode fluorescent lamps 41 are able to be properly disposed between the light guide plates 40, 401, 402 according to the size of the backlight module 4 and the brightness demands. Besides, the light radiating from the cold cathode fluorescent lamps 41 can emit along various directions first. When the light goes through the light guide plates 40, 401, 402, the light can be directed upward. Or, the directed light from the light guide plates 40, 401, 402 can be directed to the reflectors 43, and then such directed light can be reflected back to the light guide plates 40, 401 402 by the reflectors 43. In other words, if the light from the cold cathode fluorescent lamps 41 is transmitted upward to the openings 201 (as shown in FIG. 2), the light will pass through the openings 201 directly. But, if the light is transmitted to the remaining portion of translucent membranes 42 (the portion except the openings), the lights will be reflected downward, and then reflected upward and transmitted outward by the light guide plates 40, 401, 402 and the reflectors 43. As a result, with the design of using the translucent membrane having openings mounted thereon, one can distribute the light more uniformly and prevent the cold cathode fluorescent lamp from appearing too obviously within the LCD panel (not shown).

Figure 5:
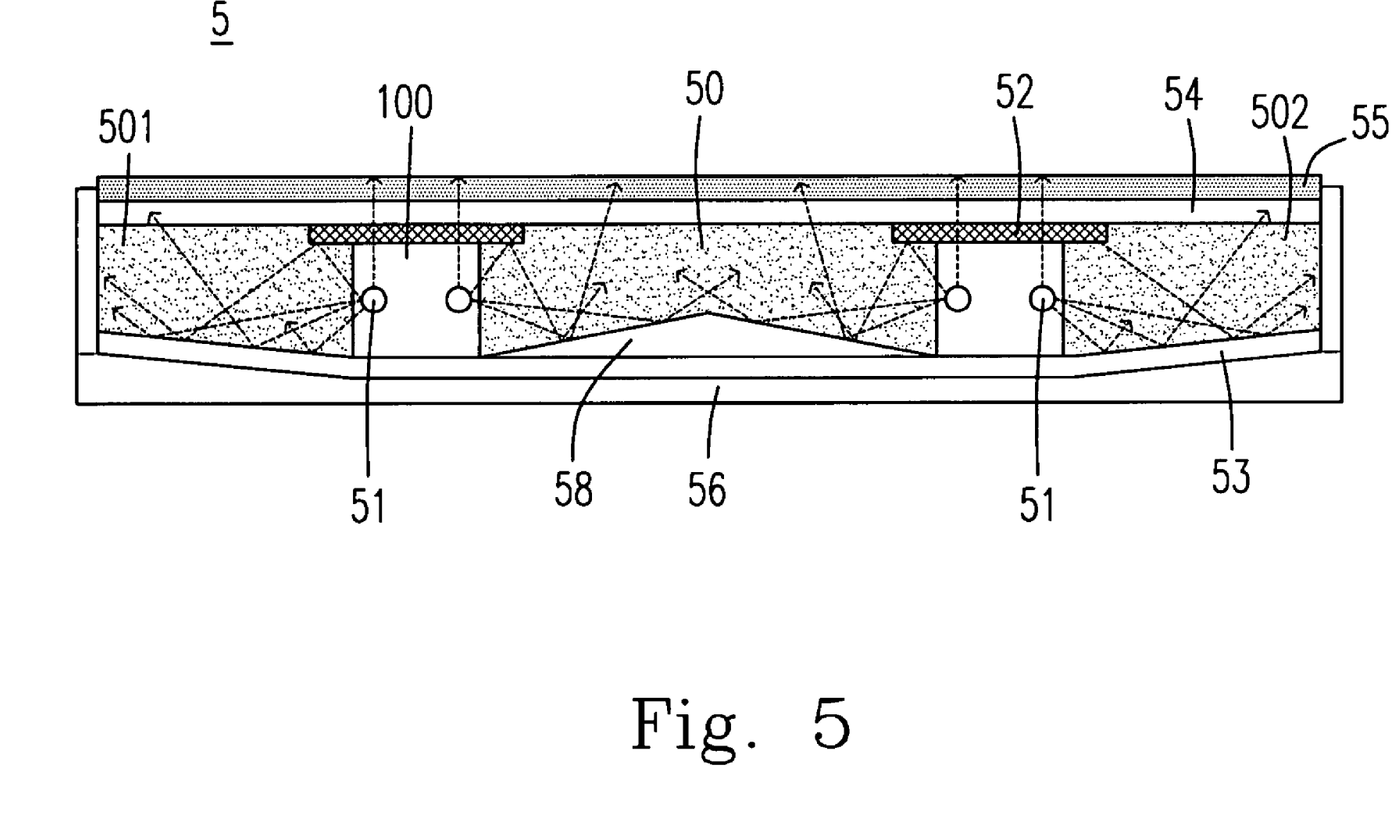
FIG. 5 shows a diagram of the backlight module according to a third preferred embodiment of the present invention.

Please refer to FIG. 5, which is a structural diagram of the backlight module according to the third preferred embodiment of the present invention. The backlight module 5 includes the cold cathode fluorescent lamps 51, a plurality of light guide plates 50, 501, 502, the translucent membranes 52, the reflectors 53, the space 100 for positioning the cold cathode fluorescent lamps 51, the diffusers 54 the lens sheet 55 and the frame 56. The light guide plate 50 located between the cold cathode fluorescent lamps includes a triangular concave 58 at its bottom for increasing the brightness of the backlight module 5.

Figure 6:
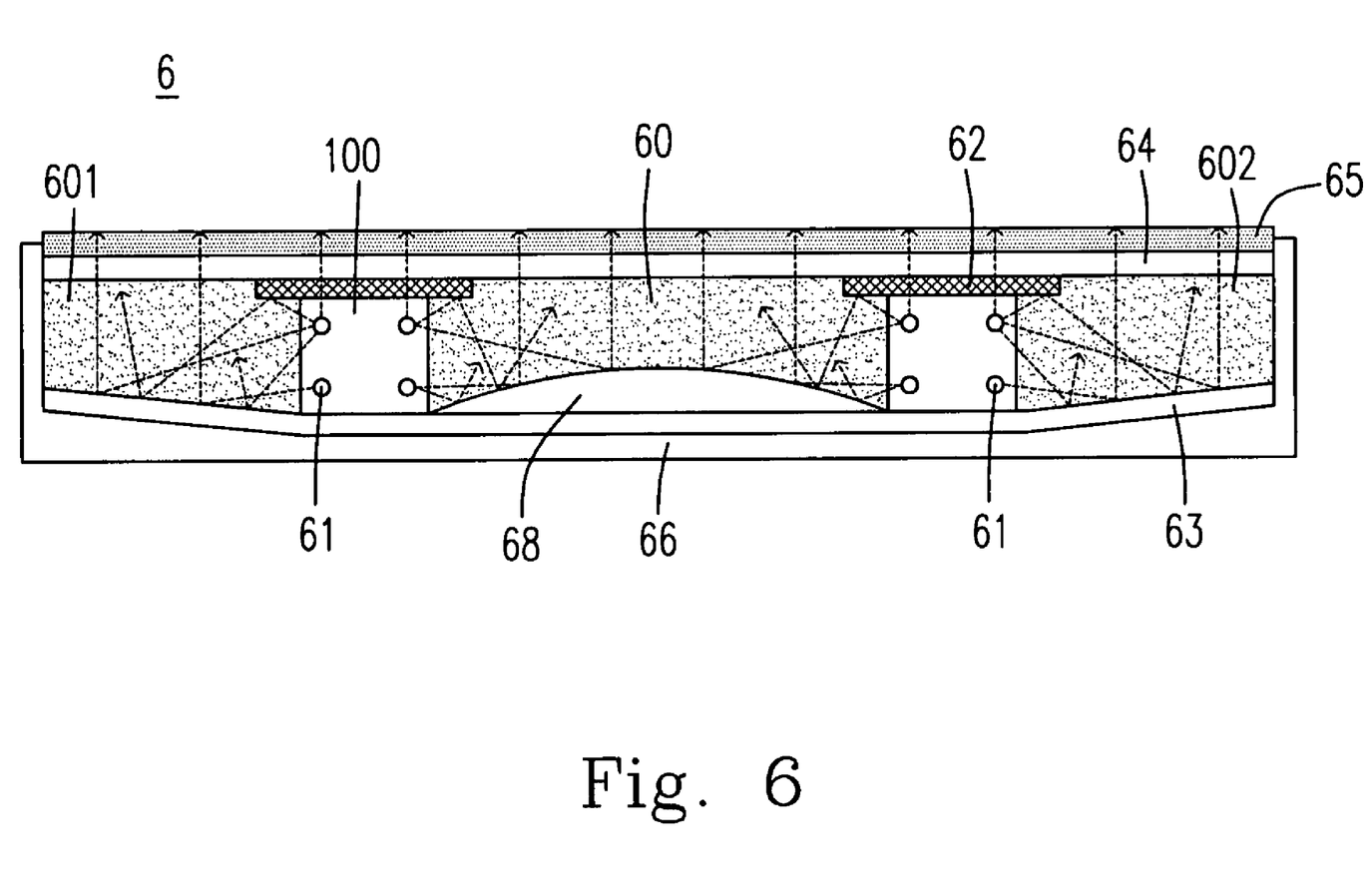
FIG. 6 shows a diagram of the backlight module according to a fourth preferred embodiment of the present invention.

Please refer to FIG. 6, which is a structural diagram of the backlight module according to the fourth preferred embodiment of the present invention. The backlight module 6 includes the cold cathode fluorescent lamps 61, a plurality of light guide plates 60, 601, 602, the translucent membranes 62, the reflectors 63, the space 100 for receiving the cold cathode fluorescent lamps 61, the diffusers 64, the lens sheet 65, and the frame 66. The main difference between the backlight module 6 (FIG. 6) and the backlight module 5 (FIG. 5) is that the triangular concave 58 (FIG. 5) is replaced by an arc concave 68. Similarly, the arc concave 68 has the efficacy of increasing the brightness of the backlight module 6.

Figure 7:
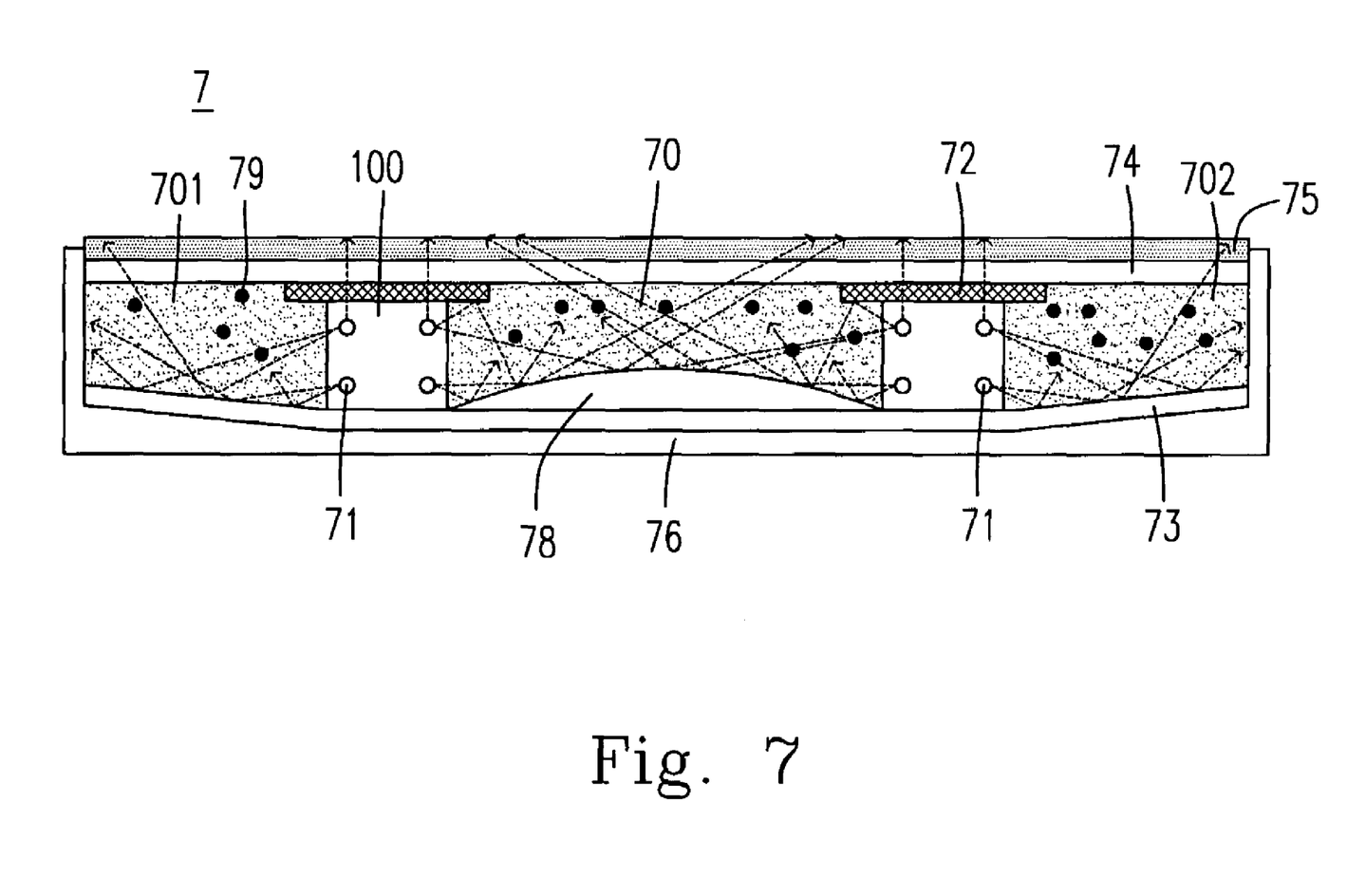
FIG. 7 shows a diagram of the backlight module according to a fifth preferred embodiment of the present invention.

Please refer to FIG. 7, which is a structural diagram of the backlight module according to the fifth preferred embodiment of the present invention. The backlight module 7 includes the cold cathode fluorescent lamps 71, a plurality of light guide plates 70, 701, 702, the translucent membranes 72, the reflectors 73, the space 100 for receiving the cold cathode fluorescent lamps 71, the diffusers 74, the lens sheet 75, and the frame 76. The main difference between the backlight module 7 (FIG. 7) and the backlight module 6 (FIG. 6) is that the doping particles 79 are doped into the plural light guide plates 70, 701, and 702. Therefore, the brightness of the backlight module 7 will be further increased due to the doping particles 79 and the arc concave 78. Similarly, the doping particles can be applied in the backlight module 5 having the triangular concave (as shown in FIG. 5), and the new backlight module will have better brightness accordingly.

Figure 8:
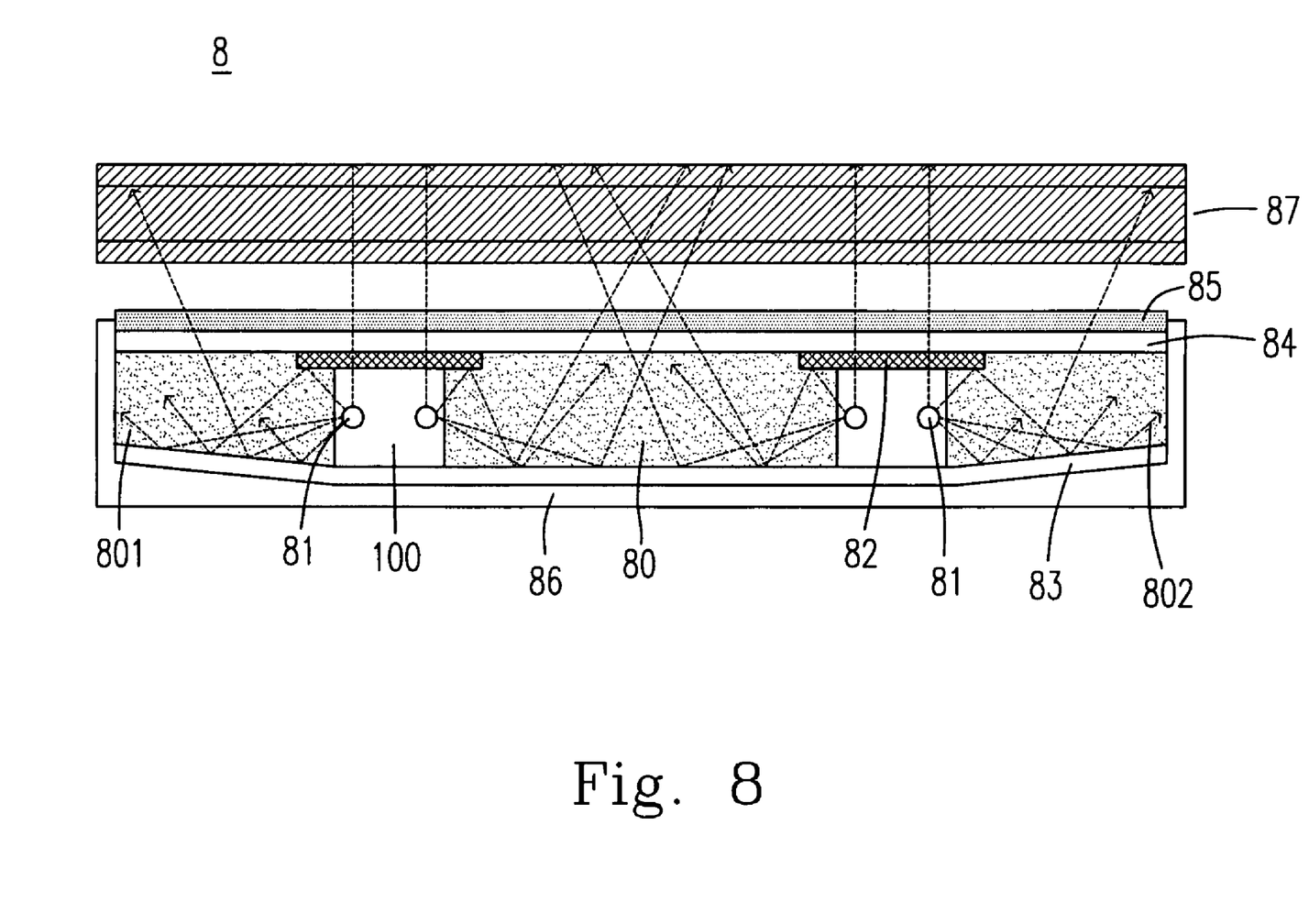
FIG. 8 shows a diagram of the liquid crystal display according to a sixth preferred embodiment of the present invention.

Please refer to FIG. 8, which shows a liquid crystal display according to the sixth preferred embodiment of the present invention. The liquid crystal display 8 includes the liquid crystal panel 87, the cold cathode fluorescent lamps 81, plural light guide plates 80, 801, 802, the translucent membranes 82, the reflectors 83, the diffusers 84, the lens sheet 85, and the frame 86. The light guide plates 80, 801, 802, the cold cathode fluorescent lamps 81, the translucent membranes 82, the reflectors 83, and the diffusers 84 can be the same as any one of the above-mentioned embodiments. The main feature of the sixth embodiment of the present invention is that the liquid crystal panel 87 is disposed above the diffusers 84.

As the above-mentioned description, one advantage of the backlight module according to the present invention is to improve the control of the transmitted direction of the light by disposing the lamp tube between the wedge-shaped light guide plates. Another advantage of the backlight module according to the present invention is to provide a design having greater brightness but with no unnecessary increases of the thickness and the weight. Further, since the backlight module according to the present invention has great brightness, the numbers of the luminaries used can be decreased, and the relevant power consumption and the relevant cost can be decreased accordingly. Therefore, the backlight module according to present invention conforms to the design trend of the LCD, which is compact, light-weight, and low-cost. Further, the backlight module according to the present invention has a translucent membrane having plural openings mounted thereon. With the design of the translucent membrane and the openings, the backlight module according to the present invention can provide a light with greater brightness and a more uniform light distribution.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
    at least a luminary for providing a light;
    a light guide assembly disposed adjacent to said luminary for directing a first portion of said light; and
    a translucent membrane disposed above said luminary comprising a plurality of openings thereon.

2. The backlight module as claimed in claim 1, wherein said light guide assembly comprises a plurality of light guide plates, and the luminary disposed within.

3. The backlight module as claimed in claim 2 further comprising a doping particle in at least one of said plurality of light guide plates.

4. The backlight module as claimed in claim 2, wherein at least one of said plurality of light guide plates has a triangular concave or an arc concave at a bottom.

5. The backlight module as claimed in claim 1 wherein a second portion of said light passes upwardly through said openings and a third portion of said light is directed upwardly by said light guide assembly after being reflected by said translucent membrane.

6. The backlight module as claimed in claim 1 further comprising:
   a reflector disposed below said light guide assembly for reflecting said light;
   a diffuser disposed above said light guide assembly and said translucent membrane for distributing said light; and
   a lens sheet disposed above said diffuser for modifying a direction of said light.

7. The backlight module as claimed in claim 1, wherein said luminary is a cold cathode fluorescent lamp.

8. The backlight module as claimed in claim 1, wherein said translucent membrane is one of an arc membrane and a planar membrane.

* * * * *